United States Patent [19]

Bocabeille et al.

[11] 3,828,131

[45] Aug. 6, 1974

[54] DIALLING DISCRIMINATOR

[75] Inventors: Gilbert Bocabeille, Meudon-La-Foret; Rene Augris, Versailles, both of France

[73] Assignee: Compagnie Industrielle Des Telecommunications Cit-Alcatel, Paris, France

[22] Filed: Apr. 19, 1972

[21] Appl. No.: 245,411

[30] Foreign Application Priority Data

Apr. 19, 1971 France .............................. 71.13776

[52] U.S. Cl. .................................. 178/69 G, 178/88

[51] Int. Cl. ........................................... H04e 25/02

[58] Field of Search ......... 178/88, 69, 2 R, 3, 4.1 R, 178/53.1, 58, 69 R, 69 G

[56] References Cited

UNITED STATES PATENTS

| | | | |
|---|---|---|---|
| 3,519,743 | 7/1970 | Herter | 178/4.1 R |
| 3,668,314 | 6/1972 | Rousseau | 178/69 G |

*Primary Examiner*—Thomas A. Robinson
*Attorney, Agent, or Firm*—Sughrue, Rothwell, Mion, Zinn & Macpeak

[57] ABSTRACT

A dialling discriminator which may be connected to a receiver unit and which is adapted to distinguish between incoming decimal and arrythmic dialling signals. A first polarity sampling is made 130ms after the receipt of an incoming signal. If the sample is negative then decimal dialling is indicated since arrythmic dialling, by definition, is always positive at this point. If the sample is positive, however, no decision can be made and a second polarity sample is taken at 160ms. If this second sample is negative then arrythmic dialling is indicated, since same is always negative at this point while decimal dialling is always positive.

10 Claims, 3 Drawing Figures

DIALLING DISCRIMINATOR

BACKGROUND OF THE INVENTION

This invention concerns a dialling discriminator, suitable for telecommunications and more particularly for telegraphic exchanges.

The present invention is particularly adapted to discriminate the type of dialling used on international telegraphic links.

An outgoing international telegraph station in any country must be adaptable to the various types of dialling used in the different countries with which it can communicate. Dialling is generally by arrhythmic modulation or decimal modulation.

The invention can be advantageously incorporated in an assembly carrying out checking and monitoring of international communications, this assembly being connected in parallel to the outgoing lines of an international station to receive all such data, and is useful to the operation and administration of the station. Previously, assemblies provided with a test receiver element have had to include connections with the communication routing indicator element, these connections identifying the arrythmic or decimal dialling to be used for contacting the distant exchange, in dependence on the routing indication. The test receiver was thus set up to operate as a pulse counter in the case of decimal dialling.

SUMMARY OF THE INVENTION

The device according to the invention is characterized in that it enables arrhythmic and decimal dialling to be discriminated purely on the basis of the line modulation received at the test receiver, the device thus appropriately setting up the receiver without recourse to the routing indication connections.

By extension, decimal dialling received in a telegraphic autocommutator can be directly discriminated with the device associated with the dialling receiver of the exchange and the receiver appropriately set up. It is thus unnecessary to assign special categories to the incoming circuits according to whether they receive arrhythmic or decimal dialling, and to suppress connections to the receiver for the indication of arrhythmic or decimal category circuits.

The device according to the invention is characterized in that it comprises means for discrimination of arrhythmic or decimal automatic dialling as well as for discrimination of decimal manual dialling (carried out with the dial of a teleprinter), arrhythmic manual dialling (teleprinter keyboard) being discriminated in a known manner in a register of the autocommutator, without intervention by the device.

According to another characteristic of the invention, the device is coupled to a receiver assembly by means of several connections transferring data from the receiver to the device and by a connection transferring data from the device to the receiver, the data transferred to the device by the receiver assembly including an indication of manual or automatic dialling, data relating to manual dialling being the state of the first four bits or moments of the reception of a decimal pulse, and the data relating to automatic dialling being the line polarity state at a given time, periodically defined by the device under the control of the receiver assembly, the data given to the receiver assembly by the device, after analysis of the received data, being the decimal dialling discrimination.

According to another characteristic of the invention, the device includes two transistorized amplifier elements, a monostable flip-flop, two bistable flip-flops and a memory element, these various elements being interconnected by circuits comprising decoupling diodes and biasing resistances.

In accordance with another characteristic of the invention, the first inverter-amplifier element enables decimal manual dialling to be detected a certain time after the beginning of reception of a pulse, this time being defined by the triggering of the monostable flip-flop in response to a control signal provided at the end of a counter cycle of the receiver set up for arrhythmic reception, the first element being cut off and the second inverter-amplifier element becoming conductive and charging the memory which supplies a decimal discrimination control signal to the receiver.

In accordance with another characteristic of the invention, the time period for discriminating between arrhythmic or decimal automatic dialling is defined by the monostable flip-flop triggered at the end of each cycle of the counter of the receiver set up to operate with arrhythmic reception, except when the device indicates decimal discrimination, the time period being the triggered period of the monostable flip-flop.

According to another characteristic of the invention, the position of each of the bistable flip-flops memorizes the respective positive or negative state of the line, the second inverter-amplifier element being freed at the beginning or at the end of the triggered period of the monostable flip-flop, the negative line state at the beginning of the triggered period characterizing reception of at least two decimal dialling pulses and causing freeing of said element, a positive line state during the triggered period of the monostable flip-flop characterizing reception of a single decimal dialling pulse and freeing said element at the end of the triggered period of the monostable flip-flop, which second element charges the memory which supplies a decimal discrimination signal to the receiver.

According to another characteristic of the invention, the freeing of the second element at the beginning of the triggered period of the monostable flip-flop is made possible by symmetric control signals applied to the two inputs of the bistable flip-flops associated with negative line state, one of these control signals coming from the receiver and the other from the direct output of the bistable flip-flop associated with positive line states.

According to a still further characteristic of the invention, if the line passes from the positive to the negative state during the triggered period of the monostable flip-flop, the second inverter-amplifier element is maintained cut off in the determined time period, this cutting off being ensured in a first interval by the complementary output of the bistable flip-flop associated with the positive line state, then in a successive second interval by the direct output of the monostable flip-flop, the absence of a decimal dialling indication signalling to the receiver that it should remain in its arrhythmic dialling reception state.

BRIEF DESCRIPTION OF THE DRAWINGS

The invention will now be described in more detail, by way of example only and with reference to the accompanying diagrammatic drawings in which.

DETAILED DESCRIPTION OF THE PREFERRED EMBODIMENTS

Figure 1:
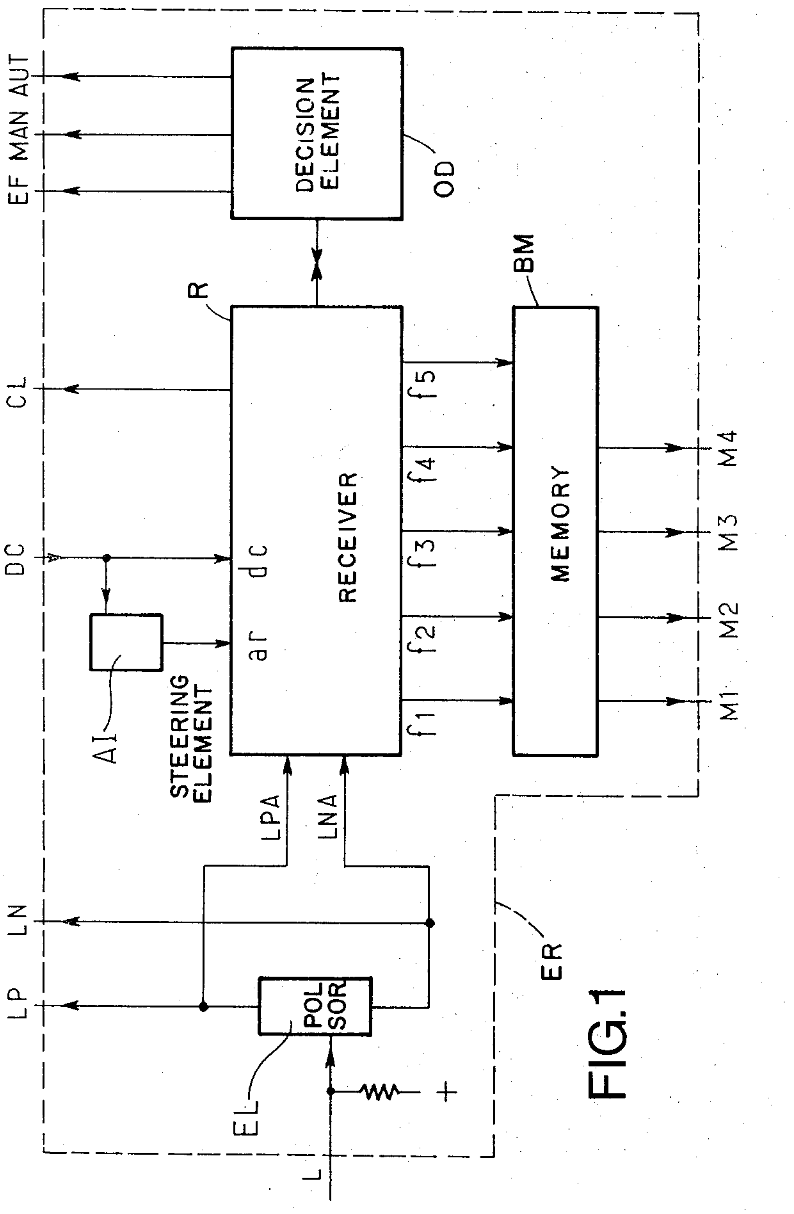
FIG. 1 shows a telegraph receiver to which a dialling discriminator according to this invention is connected.

Referring to FIG. 1, a telegraph line L is connected to the input of a polarity sensing element EL which indicates positive states on the line L by raising wires LP and LPA and negative states on the line by raising wires LN and LNA.

Figure 2:
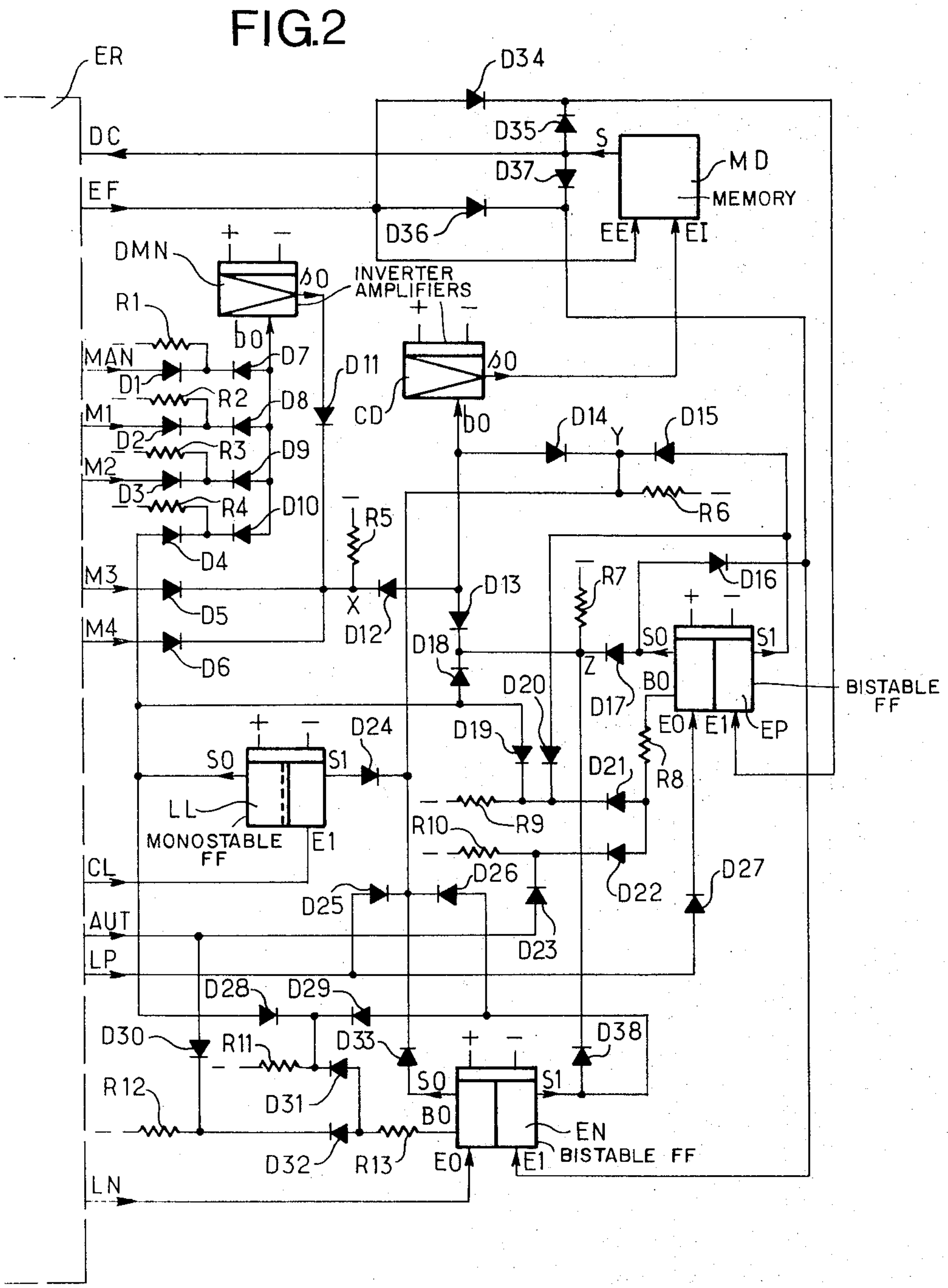
FIG. 2 shows the dialling discriminator of this invention.

The receiver proper R contains a distribution element for the characteristic bits or pulses of an arrhythmic modulation, the negative pulses of a combination being marked in the order by their reception by raising the potentials on wires *f*1 to *f*5. These are memorized in a memory BM so that there is thus retained an indication of the first number received. Connections M1 to M4 transfer the markings following reception of the first four bits to the dialling discriminator of the invention as shown in FIG. 2. At the end of reception of a number the distributor marks wire CL with a reading control signal authorizing the dialling discriminator to consult wires LP and LN to determine the state of the line.

If the discriminator finds decimal reception, a control signal is applied to the receiver R over connection DC which is also applied to a steering element AI to inhibit selection of arrhythmic reception in the receiver and causing the receiver to be set up for decimal reception.

A decision element OD is connected to the receiver R and supplies a control signal to the dialling discriminator over one of three wires MAN, AUT or EF. Marking of wires MAN and AUT respectively signify manual or automatic dialling, while marking of wire EF indicates that the discriminator must be reset, in the case of faulty operation for example.

Referring to FIG. 2, the dialling discriminator is shown connected to the receiver assembly ER of FIG. 1. Wires MAN, M1 and M2 are connected to the anodes of respective diodes D1, D2 and D3. The cathodes of these diodes are connected to those of further diodes D7, D8 and D9 respectively, whose anodes are connected together to the input BO of an inverter-amplifier DMN. The cathodes of diodes D1, D2 and D3 are also connected through respective resistances R1, R2 and R3 to the negative supply pole.

Wires M3 and M4 from the receiver assembly ER are connected to the anodes of respective diodes D5 and D6. Their cathodes are connected together to the cathode of a diode D11 whose anode is connected to the output SO of the inverter-amplifier DMN. The cathodes of diodes D5 and D6 are also connected to the negative supply pole through a resistance R5 and to the cathode of a diode D12 whose anode is connected to the input BO of a further inverter-amplifier CD.

Wire CL from the receiver assembly ER is connected to the input E1 of a monostable flip-flop LL whose output SO is connected to the anode of a diode D4. The cathode of the diode D4 is connected to that of a diode D10 whose anode is connected to the input BO of inverter-amplifier DMN. It is also connected to the negative supply pole through a resistance R4. The output SO of flip-flop LL is also connected to the anode of diodes D18 and D19. The cathode of the former is connected to the cathode of a diode D13 whose anode is connected to the input BO of inverter-amplifier CD, and also to the cathode of a diode D17, through a resistance R7 to the negative supply pole and to the cathode of a diode D38. The anode of diode D17 is connected to the output SO of a bistable flip-flop EP. The anode of diode D38 is connected to the output S1 of a bistable flip-flop EN.

The input BO of inverter-amplifier CD is connected to the anode of a diode D14 whose cathode is connected to that of a diode D15 whose anode is connected to an output S1 of the flip-flop EP. The junction Y of the cathodes of diodes D14 and D15 is connected to the negative supply pole through a resistance R6, to the cathode of a diode D24 whose anode is connected to the output S1 of flip-flop LL, to the cathodes of diodes D25 and D26, and to the cathode of a diode D33 whose anode is connected to the output SO of flip-flop EN. The anode of diode D25 is connected to wire LP from the receiver assembly ER and also to the anode of a diode D27 whose cathode is connected to an input EO of flip-flop EP. The anode of diode D26 is connected to the output S1 of flip-flop EN and to the anode of a diode D29 whose cathode is connected to that of a diode D28. The anode of diode D28 is connected to the output SO of flip-flop LL. The junction of the cathodes of diodes D28 and D29 is connected to the negative supply pole through a resistance R11 and to the cathode of a diode D31, whose anode is connected through a resistance R13 to the output BO of flip-flop EN. The anode of diode D31 is also connected to that of a diode D32 whose cathode is connected to the negative supply pole through a resistance R12 and to the cathode of a diode D30. The anode of diode D30 is connected to wire AUT from the receiver assembly ER and to the anode of a diode D23.

The cathode of diode D23 is connected to the negative supply pole through a resistance R10 and to the cathode of a diode D22 whose anode is connected to that of a diode D21, and through a resistance R8, to an output BO of flip-flop EP. The cathode of diode D21 is connected to that of diode D19, through a resistance R9 to the negative supply pole, and to the cathode of a diode D20 whose anode is connected to the output S1 of the flip-flop EP.

The output SO of flip-flop EP is connected to the anode of a diode D16 whose cathode is connected to the input E1 of flip-flop EN. The input EO of flip-flop EN is connected to wire LN from the receiver assembly ER.

Wire EF from the receiver assembly ER is connected to the anode of a diode D36 whose cathode is connected to the input E1 of flip-flop EN and to the cathode of a diode D37. The anode of diode D37 is connected to that of a diode D35. The junction of the anodes of diodes D35 and D37 is connected to wire DC and also to an output S of a memory MD. An input EE of the memory Md is connected to the anode of diode D36 and an input E1 is connected to the output SO of the inverter-amplifier CD.

The anode of diode D36 is connected to that of a diode D34 whose cathode is connected to that of diode D35 and to the input E1 of the flip-flop EP.

The output SO of the inverter-amplifier DMN is connected to the anode of a diode D11 whose cathode is connected to the junction X of the cathodes of diodes D5, D6 and D12. The junction Z of the cathodes of diodes D13, D17, D18 and D38 is connected to the negative supply pole through a resistance R7.

Figure 3:
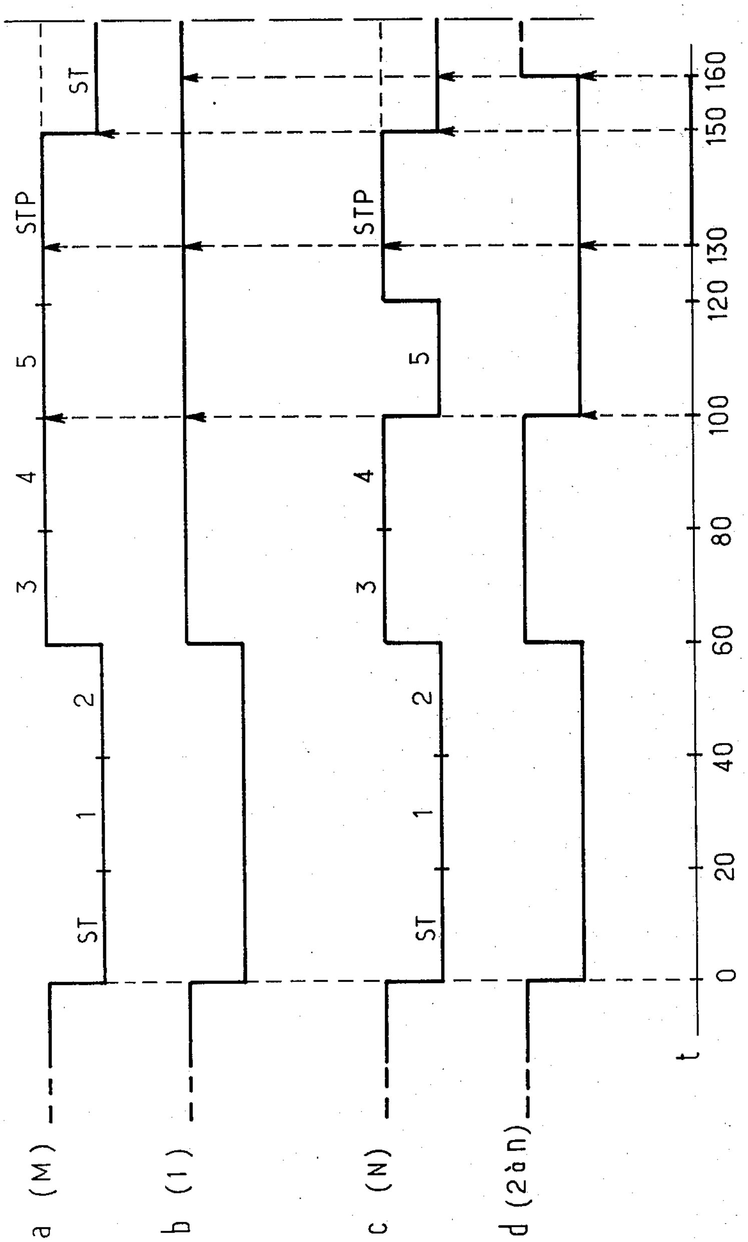
FIG. 3 shows four waveform diagrams of telegraph line signals to assist in understanding the operation of and concept behind this invention.

FIG. 3 shows the telegraph line states during a period of 160 milliseconds. Waveform diagrams *a* and *c* of FIG. 3 shows arrhythmic reception of the letters M and N in the international alphabet number 2. Diagrams *b* and *d* show decimal reception of the digit 1 and digits 2 to *n* respectively. Positive voltages on the line are represented by the higher level in the waveform diagrams and negative voltages by the lower levels.

Characters in the international alphabet number 2 are transmitted by arrhythmic modulation comprising a start signal ST which is always negative and of a duration of 20 milliseconds, five successive bits of 20 milliseconds, labelled 1 to 5 in the diagram, each of which can be at a positive or negative potential, depending on the combination to be transmitted, and a stop signal STP which is always positive and has a duration of 30 milliseconds. The reception of a character, the letter M or the letter N for example, is thus always effected within a period of 150 milliseconds for arrythmic dialling.

The similarity between the reception of a decimal pulse and the reception of the letter M or the letter N lasts until 100 milliseconds from the time orgin $t_o$. This is clearly seen from FIG. 3. The time 130 milliseconds from $t_o$ is marked in the receiver and the period between 130 and 160 milliseconds from $t_o$ is the period of the monostable flip-flop LL. This discrimination between decimal and arrhythmic automatic dialling is carried out in this period.

When the dialling discriminator is on-line, and the telegraph line receives no modulation, only wire LP is marked with zero potential by the receiver assembly ER. This has no effect on the flip-flop EP whose output SO is positive and whose output S1 negative, due to the negative potential applied to its input BO via resistances R9 and R10. The flip-flop EN has its output SO positive and its output S1 netative due to the negative potential presented to its input BO through resistances R11 and R12.

The monostable flip-flop LL is not triggered and its output SO is negative, its output S1 being positive. The inverter-amplifier DMN is conducting, its input BO receiving a negative potential through resistances R1 to R4. Its output SO is at a positive potential and output current flows through diode D11 and resistance R5.

Points X, Y and Z are all at a positive potential (output SO of inverter-amplifier DMN, outputs S1 of flip-flop LL and SO of flip-flop EN, and output SO of flip-flop EP). The inverter-amplifier CD is cut off. Memory MD is not loaded and no control signal is provided at its output S.

Manual dialling is carried out by a subscriber using the dial of his teleprinter instrument or possibly a keyboard, depending on the system in use in the country concerned. In the case of keyboard dialling the autocommutator receiver receives the digits in arrhythmic modulation, whereas dialling with a telephone-type dial produces digits in decimal modulation.

Keyboard dialling in the international alphabet number 2 must begin with an inversion number code (++-++) which is discriminated in a well-known manner in the register of the telegraph autocommutator. The register frees the chain after a delay when the inversion number is not received.

On reception of dialling codes preceded by the inversion number, the receiver assembly ER sets earth potential on wires MAN and M3, these markings leaving the availability state of the dialling discriminator unchanged.

In dialling with a telephone-type dial, a dial pulse can be considered by the receiver as the reception of the letter M combination (diagram *a* in FIG. 3) or the letter N combination (diagram *c*) until 100 milliseconds from the time origin $t_o$, whether the pulse is a single pulse, as in diagram *b*, or the first of a series, as in diagram *d*. Since no character other than the inversion number can precede the manual dialling codes, the dialling discriminator indicates that decimal type dialling is in progress. For this, the receiver places a reading control signal on the wire CL of the dialling discriminator 130 milliseconds after the time origin $t_o$, that is to say at the end of the cycle with the receiver set for arrhythmic modulation reception. At this moment, which is 10 milliseconds after the beginning of the 30 milliseconds stop signal following the reception of a character in arrhythmic modulation, a single decimal dialling pulse or the first pulse of a decimal dialling series has been effectively received, as will be appreciated from diagrams *b* and *d* in FIG. 3.

On reception of the reading control signal, the monostable flip-flop LL is triggered so that its output SO is positive and its output S1 negative. Current flows from output SO through diode D4 and resistance R4. Since resistances R1 to R4 are all supplied with current, the inverter-amplifier DMN is cut off. Since wires M3 and M4 are not raised, the resistance R5 is cut off from the supply when the inverter-amplifier DMN is cut off. Point X is then at a negative potential so that input BO of inverter-amplifier CD is negative and this latter begins to conduct. A positive potential is applied to the inscription input EI of the memory MD which memorizes the decimal dialling discrimination signal and transfers it over wire DC to the receiver. On reception of this signal, the receiver is set up as a pulse counter and transfers at the end of each cycle as indication of the number of pulses received in the decimal dialling sequence.

Automatic dialling proceeds from an automatic source and can be in decimal or arrhythmic modulation. The receiver assembly ER is alerted to the imminent reception of an automatic dialling train and applies earth potential to wire AUT of the dialling discriminator. This potential is applied to resistances R10 and R12 and maintained there.

In the case of receipt of decimal dialling with several pulses, that is in the case of numbers other than 1, between 100 and 160 milliseconds from the time origin $t_o$ the line is at a negative potential, as shown in diagram *d* in FIG. 3. There is thus earth potential on wire LN. 130 milliseconds from $t_o$, the receiver raises wire CL so that the monostable flip-flop LL is triggered and its output SO becomes positive.

At this time, it can be determined if a decimal pulse of a series (i.e., a decimal number other than 1) has been received, since this instant is in the middle of the following pulse, as shown in diagram *d* in FIG. 3. Discrimination of decimal dialling can thus be effected at this moment, corresponding to the triggering of the monostable flip-flop.

An output current flows from output SO of the flip-flop LL through resistances R9 and R11. Thus the triggering of flip-flop LL suppresses the negative potential on input BO of flip-flops EP and EN. Since input EO of flip-flop EP is not supplied, there being no raising of wire LP, this flip-flop remains in the state in which output SO is positive and output S1 negative. The flip-flop EN is blocked on both outputs, inputs EO and E1 being held positive by the raising of wire LN and the positive potential at the output SO of flip-flop EP, respectively.

Thus, the triggering of flip-flop LL and the cutting off of flip-flop EN results in the appearance of a negative potential at point Y. The inverter-amplifier CD begins to conduct and charges the memory element MD whose output S applies a positive potential to wire DC. The receiver is thus advised of the reception of decimal dialling, and is set up to operate as a pulse counter.

In the case of a single pulse, that is the decimal number 1, the line assumes a positive potential and remains in this state from an instant 60 milliseconds from the time origin $t_o$. There is thus earth potential on the wire LP.

As previously described, 130 milliseconds from $t_0$ a reading control signal is applied to wire CL and the monostable flip-flop LL is triggered so that its output SO goes positive. At this time it is certain that a single pulse has been received, the line being positive as shown in diagram *b* in FIG. 3. To prevent the received pulse being confused with letter M or letter N, the dialling discriminator waits until 160 milliseconds have passed from $t_0$ before carrying out the dialling discrimination. The line remains at a positive potential in the case of the decimal number 1 (diagram *b*) but goes negative in the case of reception of arrhythmic modulation (diagram *a* or diagram *c*). The 30 milliseconds between 130 and 160 milliseconds from $t_0$ is the period of the monostable flip-flop LL. The instant 160 milliseconds from $t_0$ is thus situated in the middle of a start signal ST after reception of a character in arrhythmic modulation, permitting a reception of such modulation with a distortion level of ± 40 percent.

When flip-flop LL is triggered, current flows from output SO through resistance R9 and resistance R11. Flip-flop EP changes state, its input BO being inhibited since resistances R9 and R10 are connected to the supply and its input EO receiving a positive potential from wire LP. The output S1 of flip-flop EP becomes positive and holds point Y positive during the 30 millisecond period of the monostable flip-flop LL, whose output S1 is now negative. During this period point Z is held at a positive potential by the output SO of flip-flop LL, after the inversion of the bistable flip-flop EP whose output SO has become negative.

On triggering of flip-flop LL, the input BO of flip-flop EN being inhibited by the supply to resistance R11, the flip-flop EN is unlocked but rests in its initial state with output SO positive. This is because its input E1 is not supplied with a positive potential, the input SO of flip-flop EP being negative.

At the end of the 30 millisecond period of flip-flop LL, that is 160 milliseconds from $t_o$, the output SO of flip-flop LL goes negative as does point Z to unlock the inverter-amplifier CD. The memory MD receives a decimal discrimination control signal and transfers it to the receiver.

Although the output SO of flip-flop LL is now negative, resistance R9 is supplied by the output S1 of flip-flop EP which is positive. The flip-flop EP thus remains with its output SO negative between the end of the period of monostable flip-flop LL and the energization of the memory MD. The latter then provides on its output S a signal which is applied to input E1 of flip-flop EP and returns the latter to its initial state.

In the case of arrhythmic reception, the dialling discriminator reads the line state in the 30 milliseconds between 130 and 160 milliseconds from $t_o$. When the line remains positive between 130 and 150 milliseconds from $t_o$, and then goes negative, the receiver input is known to be arrythmic modulation. The 150 ms point corresponds to the end of the stop period STP, and the beginning of the start period ST (as shown in diagram *a* FIG. 3).

The discriminator operates as just described until the moment 150 milliseconds from $t_0$ when flip-flop EP has its output SO negative.

The line then goes negative and the receiver ER applies earth potential via wire LN to the input EO of the bistable flip-flop EN which switches over so that its output SO goes negative. The positive potential at its output S1 has a double role at the end of the triggered period of flip-flop LL. It maintains the inhibition of inverter-amplifier. CD and keeps resistance R11 supplied so as to avoid the return of flip-flop EN to its initial state. Since the inverter-amplifier CD remains cut off, the receiver receives no decimal discrimination control signal and remains in the arrhythmic modulation reception state.

At the end of reception of the dialling codes, the receiver applies a positive marking potential to input EF. This is directed by diodes D34 and D36 to the inputs E1 of flip-flop EP and EN. These flip-flops are thus returned to their initial state.

What is claimed is:

1. A dialling discriminator for use in association with a telecommunications receiver which is able to receive decimal or arrythmic manual or automatic dialling signals and which includes means for distinguishing between automatic and manual dialling, the receiver being initially set for reception of arrythmic dialling signals and being switched to a decimal dialling signal reception state by the discriminator, comprising: first means for testing the polarity at the receiver input at a first predetermined time in response to the receipt of automatic dialling, as indicated by the receiver, second means for testing the polarity at the receiver input at a second predetermined time if the first-tested polarity has a predetermined value, the opposite value of the first-tested polarity and a predetermined value of the second-tested polarity indicating decimal dialling and causing the discriminator to switch the receiver to its decimal dialling signal reception state, the discriminator further comprising means responsive to an indication of faulty operation for resetting the discriminator.

2. A discriminator as claimed in claim 1, including means for memorizing the negative and positive polarities of the receiver input signal, and control means connected to a memory element for supplying a decimal discrimination control signal to the receiver.

3. A discriminator as claimed in claim 1 including first and second inverter-amplifiers and a line-reading monostable flip-flop, the input of the first inverter-amplifier being connected to the output of a four-input first gate and the input of the second inverter-amplifier being connected to the output of a two-input second gate, a first input of the first gate being connected to the direct output of the monostable flip-flop and the three other inputs of the first gate being connected to the receiver as are the two inputs of the second gate and the input of the monostable flip-flop, the receiver raising none of the inputs of the gates and the monostable flip-flop while it receives no dialling signals, so that the first inverter-amplifier is maintained conductive and the second inverter-amplifier is maintained cut off.

4. A discriminator as claimed in claim 3, in which two of the three other inputs of the first gate connected to the receiver are raised in response to the reception of a negative input pulse, the reception of two negative pulses followed consecutively by two positive pulses signifying the reception of decimal dialling, the raising of the third of these three other inputs of the first gate indicating the reception of manual dialling, so that the raising of the first input of the first gate by the monostable flip-flop and the raising of the remaining three inputs of the first gate by the receiver causes the first inverter-amplifier to be cut off and the second inverter-amplifier to be rendered conductive to trigger the memory element which supplies a decimal discrimination control signal to the receiver during the reception of the first decimal number.

5. A discriminator as claimed in claim 4, including first and second bistable flip-flops for reading the receiver input signal polarity during the predetermined first time interval, in response to the reception of automatic dialling, respectively associated with the positive and negative input polarities and linked to the line-reading monostable flip-flop, one of the bistable flip-flops receiving from the receiver a raised signal depending on whether the input polarity is positive or negative, the respective states of the bistable flip-flops, indicating a negative polarity preceeded by a positive polarity, or vice versa.

6. A discriminator as claimed in claim 5, in which each bistable flip-flop is connected to a respective pair of setting circuits, each pair of setting circuits being coupled to a set input of the respective bistable flip-flop, one setting circuit of each pair being inhibited by the receiver on reception of automatic dialling and the other circuit of each pair being inhibited by the direct output of the triggered monostable flip-flop.

7. A discriminator as claimed in claim 6, in which the outputs of the three flip-flops are linked by unidirectional connections to two bias circuits connected to the input of the second inverter-amplifier, the first bias circuit being linked to the direct output of the second bistable flip-flop, to the complemented output of the first bistable flip-flop, and to the complemented output of the monostable flip-flop, the second bias circuit being connected to the complemented output of the second flip-flop, to the direct output of the first flip-flop and to the direct output of the monostable flip-flop, the bias circuits being inhibited by at least one flip-flop output before the change of state of any flip-flop, so that the second inverter-amplifier remains cut off so long as no control signal has been receiver on the input of the monostable flip-flop.

8. A discriminator as claimed in claim 7, in which the first bistable flip-flop has its direct output connected to the second input of the second bistable flip-flop so that after reception of a first pulse, the receiver input signal polarity being negative when a reading control signal is provided during a second pulse, the bistable flip-flop remains cut off, the second inverter-amplifier being conductive and the memory element indicating decimal dialling to the receiver.

9. A discriminator as claimed in claim 7, in which the first bistable flip-flop has its complementary output connected to the setting circuit connected to the direct output of the monostable flip-flop so that, if the receiver input signal polarity remains positive after receipt of the first pulse, the first bistable flip-flop switches over as the monostable flip-flop switches over in response to the reading control signal, and remains switched over after the monostable flip-flop switches back to its initial state, thus permitting conduction in the second inverter-amplifier and the transfer of the decimal dialling indication to the receiver.

10. A discriminator as claimed in claim 9, in which the decimal discrimination memory element is connected to a second input of each of the bistable flip-flops and to a resetting connection to the receiver, so that a resetting control signal can be applied to both bistable flip-flops, either by the memory element on the determination of decimal dialling, or at any time by the receiver.

* * * * *